US 7,895,272 B2

(12) United States Patent
Matsumoto

(10) Patent No.: US 7,895,272 B2
(45) Date of Patent: Feb. 22, 2011

(54) DATA COMMUNICATION SYSTEM AND DATA COMMUNICATION METHOD

(75) Inventor: Shigeki Matsumoto, Tokyo (JP)

(73) Assignee: Sony Corporation, Tokyo (JP)

( * ) Notice: Subject to any disclaimer, the term of this patent is extended or adjusted under 35 U.S.C. 154(b) by 993 days.

(21) Appl. No.: 09/934,192

(22) Filed: Aug. 21, 2001

(65) Prior Publication Data

US 2002/0078157 A1 Jun. 20, 2002

(30) Foreign Application Priority Data

Aug. 23, 2000 (JP) ............................ P2000-252892

(51) Int. Cl.
*G06F 15/16* (2006.01)
(52) U.S. Cl. ................. 709/206; 709/203; 709/207; 709/223; 709/224; 709/225
(58) Field of Classification Search ................ 709/203, 709/206, 207
See application file for complete search history.

(56) References Cited

U.S. PATENT DOCUMENTS

| | | | | | |
|---|---|---|---|---|---|
| 5,283,887 | A | * | 2/1994 | Zachery | 715/210 |
| 5,764,899 | A | | 6/1998 | Eggleston et al. | |
| 5,974,449 | A | * | 10/1999 | Chang et al. | 709/206 |
| 6,092,114 | A | * | 7/2000 | Shaffer et al. | 709/232 |
| 6,385,306 | B1 | * | 5/2002 | Baxter, Jr. | 379/88.13 |
| 6,449,634 | B1 | * | 9/2002 | Capiel | 709/206 |
| 6,505,233 | B1 | * | 1/2003 | Hanson et al. | 709/204 |
| 6,553,341 | B1 | * | 4/2003 | Mullaly et al. | 704/9 |
| 6,571,246 | B1 | * | 5/2003 | Anderson et al. | 1/1 |
| 6,598,076 | B1 | * | 7/2003 | Chang et al. | 709/206 |
| 6,625,642 | B1 | * | 9/2003 | Naylor et al. | 709/206 |
| 2006/0143307 | A1 | * | 6/2006 | Codignotto | 709/246 |

FOREIGN PATENT DOCUMENTS

| | | |
|---|---|---|
| EP | 0 865 192 | 9/1998 |
| EP | 0865192 A2 * | 9/1998 |
| EP | 1 023 665 | 8/2000 |
| JP | 10-164169 | 6/1998 |
| JP | 0865192 A2 * | 9/1998 |
| JP | EP0865192 A2 * | 9/1998 |
| JP | 10-307769 | 11/1998 |
| WO | WO 00 42747 | 7/2000 |
| WO | WO0042747 * | 7/2000 |

OTHER PUBLICATIONS

Albrecht M et al: "IP services over Bluetooth: leading the way to a new mobility" Local Computer Networks, 1999. LCN '99. Conference on Lowell, MA, USA Oct. 18-20, 1999, Los Alamitos, CA, USA, IEEE Comput. Soc, US, Oct. 18, 1999, pp. 2-11, XP010358529 ISBN: 0-7695-0309-8.

* cited by examiner

*Primary Examiner*—Barbara N Burgess
(74) *Attorney, Agent, or Firm*—Frommer Lawrence & Haug LLP; William S. Frommer; Thomas F. Presson

(57) ABSTRACT

A data communication system includes a video camera and a mail server. The video camera, which is provided with at least an e-mail sending/receiving function, attaches obtained original still image data to e-mail, adds a tag (editing tag), and sends the e-mail to a communication network. The mail server receives the e-mail sent from the video camera on the communication network, edits the original still image data attached to the e-mail based on the added tag, attaches the edited still image data to the e-mail, and sends the e-mail to a receiving personal computer.

6 Claims, 3 Drawing Sheets

DATA COMMUNICATION SYSTEM AND DATA COMMUNICATION METHOD

BACKGROUND OF THE INVENTION

1. Field of the Invention

The present invention relates to a data communication system and a data communication method for sending and receiving electronic mail (hereinafter referred to as "e-mail") between electronic devices. More particularly, the invention relates to a data communication system and a data communication method for sending and receiving e-mail between electronic devices by an e-mail system using transmission control protocol/Internet protocol (TCP/IP) as a communication protocol.

2. Description of the Related Art

Information can be transmitted and received between communication apparatuses via a communication network, such as the Internet or Bluetooth. For example, image information can be sent from a transmitting terminal, such as a cellular telephone, to a receiving terminal, such as a personal computer via a communication network.

Hitherto, however, the following problem is presented when data, such as an image captured by a digital camera, is attached to e-mail and sent. In order to add certain information to the above-described data (image), predetermined software or hardware must be implemented in an electronic device (digital camera) for transmitting the data. If it is desired that, for example, an image to be attached to e-mail be edited, it must be edited by using image editing software or hardware before being transmitted.

However, if such an editing function or device is provided to electronic devices other than personal computers, for example, to a so-called "mobile machine", such as a cellular telephone, the development and the implementation of the mobile machines becomes burdensome. Such an editing function or device also hampers the implementation of smaller and lighter mobile machines.

Even if such a function or device is implemented on the mobile machines, when the editing function is to be upgraded, such upgrading must be performed for all the commercially available machines. That is, it is difficult to speedily and easily upgrade applications implemented on the mobile machines.

It is suspected that the operability of such mobile machines would be very poor. Unlike personal computers, mobile machines are not provided with a keyboard or a mouse as a user interface. In practice, it is thus very difficult to smoothly perform complicated operations, such as an editing operation, with a limited number of buttons.

SUMMARY OF THE INVENTION

Accordingly, in view of the above background, it is an object of the present invention to provide a data communication system and a data communication method for easily sending and receiving edited information, and for enabling the fast development of applications for performing such editing operations.

In order to achieve the above object, according to one aspect of the present invention, there is provided a data communication system for sending and receiving e-mail between electronic devices by an e-mail system using TCP/IP as a communication protocol. The data communication system includes a transmitting electronic device and a relay server. The transmitting electronic device, which is provided with at least an e-mail sending/receiving function, attaches obtained original data to the e-mail, adds a processing command, and sends the e-mail to a network. The relay server receives the e-mail sent from the transmitting electronic device, processes the original data attached to the e-mail based on the added processing command, attaches the processed data to the e-mail, and sends the e-mail to a receiving electronic device.

According to another aspect of the present invention, there is provided a data communication method for sending and receiving e-mail between electronic devices by an e-mail system using TCP/IP as a communication protocol. The data communication method includes the steps of: attaching original data obtained in a transmitting electronic device to the e-mail, adding a processing command, and sending the e-mail from the transmitting electronic device to a network; and receiving the e-mail sent from the transmitting electronic device by a relay server on the network, processing the original data attached to the e-mail based on the added processing command, attaching the processed data to the e-mail, and sending the e-mail to a receiving electronic device.

That is, in the above-described data communication system and the data communication method, the transmitting electronic device attaches the original data only with a processing command to e-mail without performing any processing, and sends the e-mail to the relay server. Then, the relay server processes the original data based on the processing command, attaches the processed original data to the e-mail, and sends the e-mail to the receiving electronic device.

With this arrangement, according to the data communication system and the data communication method of the present invention, for example, the edited information can be easily sent and received, and the development of editing applications can also be speedily implemented.

DESCRIPTION OF THE PREFERRED EMBODIMENTS

The present invention is described in detail below with reference to the accompanying drawings through illustration of a preferred embodiment.

In this embodiment, the present invention is applied to a data communication system for sending and receiving data between electronic devices via a communication network. The data communication system is used for sending and receiving e-mail between the electronic devices by an e-mail system using TCP/IP as the communication protocol.

Figure 1:
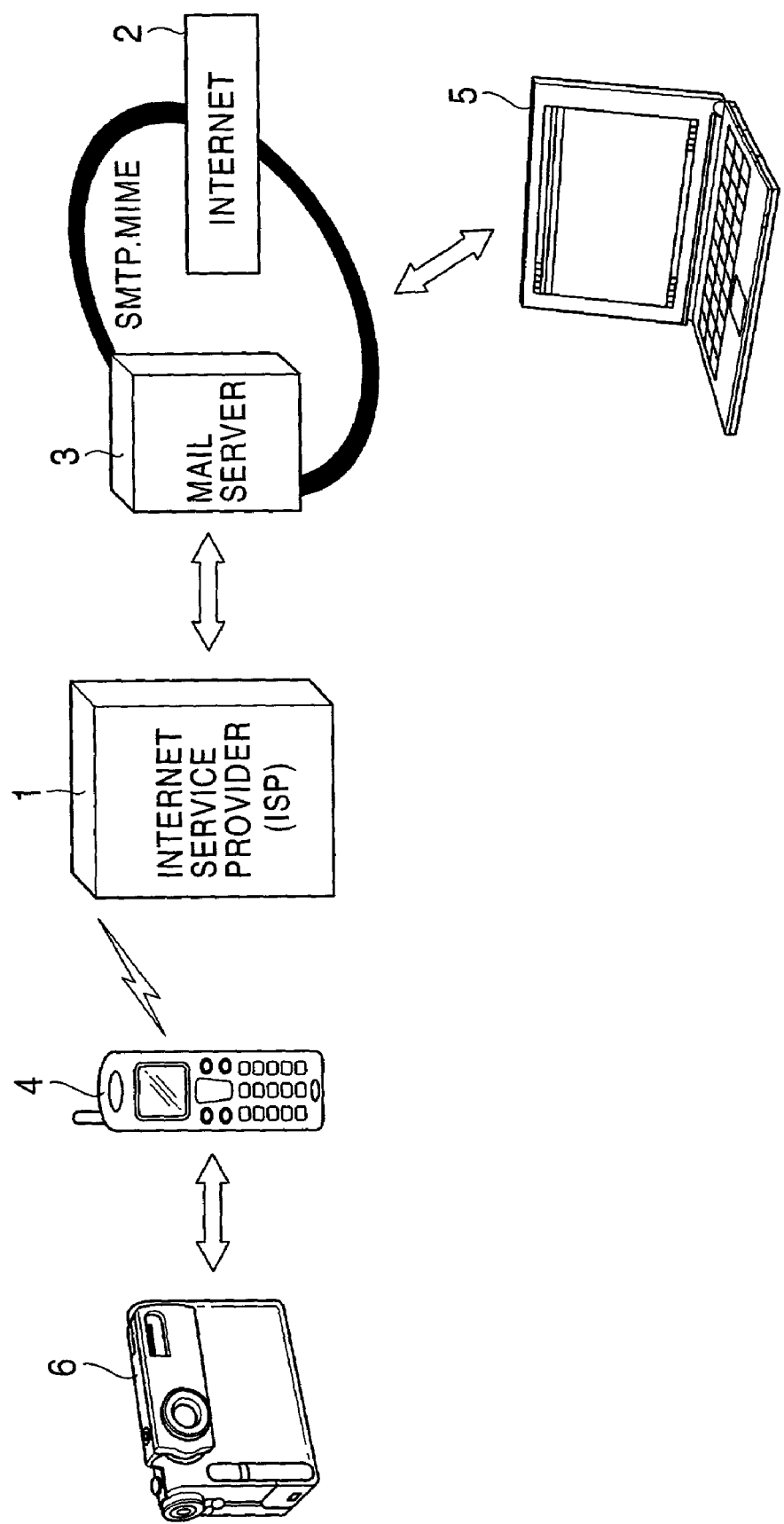
FIG. 1 is a block diagram illustrating a data communication system according to an embodiment of the present invention.

The communication network includes, as schematically shown in FIG. 1, an Internet service provider (ISP) 1 and a mail server 3 for sending and receiving e-mail between the electronic devices connected to the Internet 2 under the control of the ISP 1. In such a data communication system, a cellular telephone 4 is connected to the above-described communication network as a transmitting terminal, and a personal computer 5 is connected to the communication network as a receiving terminal. It is now assumed that image data (still image data) is input into the cellular telephone 4 from a digital camera (digital still camera) 6.

In the above-configured data communication system, the video camera 6, which is provided with at least an e-mail sending/receiving function, attaches captured original data (for example, still image data) to e-mail, adds a processing command (for example, an editing command), and then, sends the e-mail to the communication network. The mail server 3 receives the e-mail sent from the video camera 6 (more specifically, from the cellular telephone 4 connected to the video camera 6) on the communication network, and processes the original data attached to the e-mail with the added processing command. The mail server 3 then attaches the processed data (edited data) to the e-mail and sends it to a receiving electronic device (for example, the personal computer 5). That is, the mail server 3 serves as a relay server.

Accordingly, in the above-described data communication system, the processing command indicates an instruction given to a receiving terminal (in this embodiment, the mail server 3) to process the original data. By executing this processing command, desired data (for example, edited data) can be obtained.

A regular e-mail sending/receiving process performed between electronic devices (in this embodiment, between the digital camera 6 and the personal computer 5) in the above-configured information communication system is as follows.

The digital camera 6 captures still image data. A so-called mailer, which serves as a mail sending/receiving function, is implemented on the digital camera 6. By using the mailer, the digital camera 6 is able to send and receive e-mail to and from other electronic devices (in this embodiment, the personal computer 5). The digital camera 6 is connected to the cellular telephone 4 by communication means, such as a modem. The digital camera 6 sends e-mail with the captured still image data to the ISP 1 via the cellular telephone 4 by using the mailer.

The e-mail with the image data sent to the ISP 1 is further distributed to the personal computer 5, which serves as a receiving electronic device, connected to the Internet 2 via the mail server 3 which is managed by the ISP 1. The user of the personal computer 5 who has received the e-mail is then able to view the image data attached to the e-mail.

A description is now given of an e-mail sending/receiving mode implemented by the present invention. More specifically, e-mail is sent and received by adding a processing command (addition command, hereinafter referred to as a "tag") to the attached still image data.

It is now assumed that original data to be sent is still image data, and that other information, such as a frame or a background, is added to the still image data by editing the image data, namely, by executing processing according to the content of the tag.

The digital camera 6 captures still image data (hereinafter referred to as "original still image data") $P_0$, as shown in (A) and (B) of FIG. 2, and then requests the user to determine whether a tag is to be input. For example, the above request is indicated on an image display unit (not shown). The user is requested to make the above-described determination when sending the original still image data by using e-mail.

Figure 2:
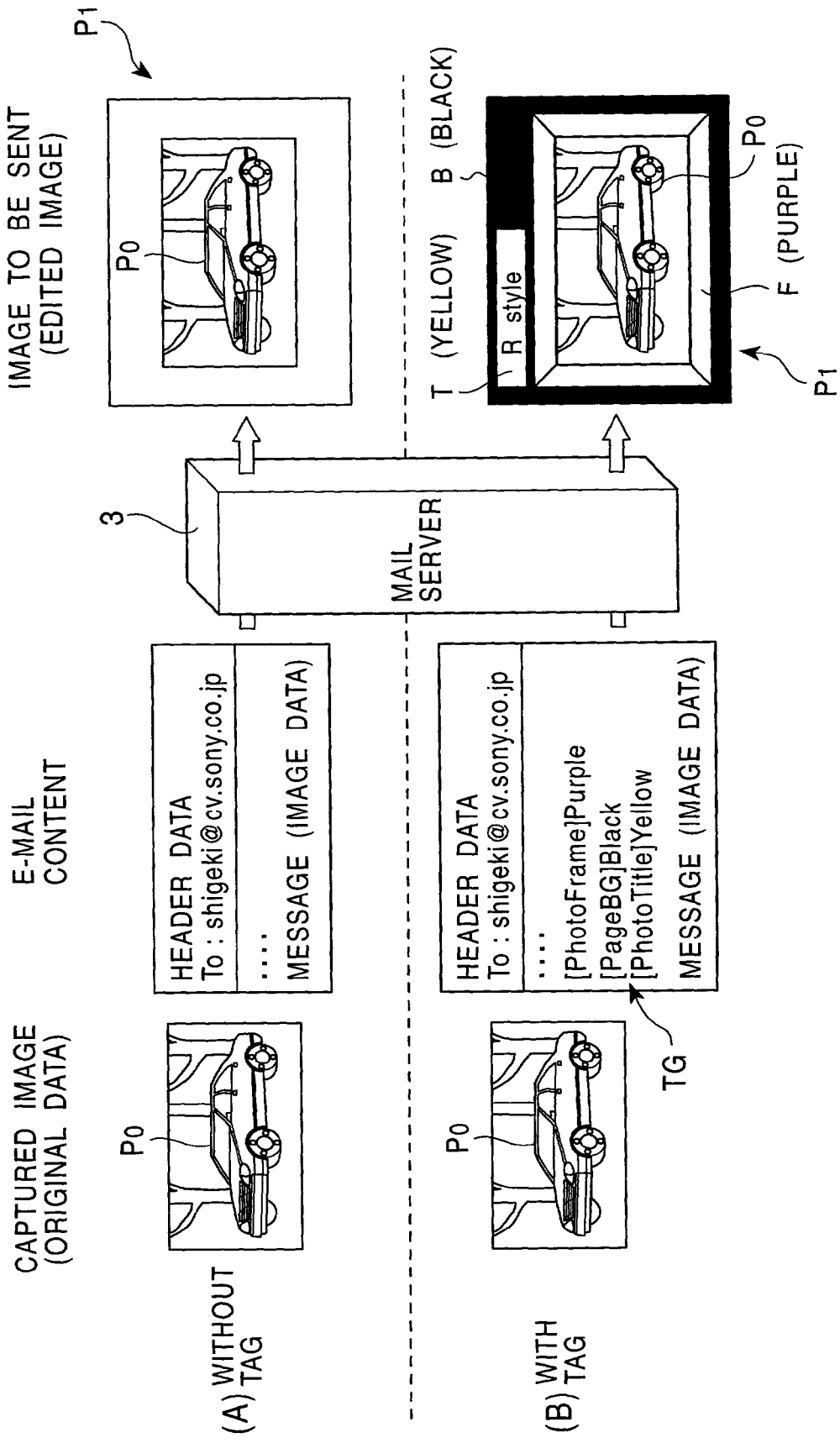
FIG. 2 illustrates an editing operation performed on image data by the data communication system shown in FIG. 1.

As shown in (B) of FIG. 2, a tag TG is input into the first part of the actual data as text. In this example, the tag TG is input between the header data indicating a mail destination (for example, data including a destination address AD) and an e-mail message with the original still image data $P_0$. The tag TG may directly be input by manually operating an operation unit of the digital camera 6, or may be automatically input by a certain system of the digital camera 6 in response to a user's request. The content of the tag TG is, for example, as follows.

TABLE 1

| Tag Content | Definition |
|---|---|
| [PhotoFrame]Purple | adding a purple frame |
| [PageBG]Black | forming a black background |
| [PhotoTitle]Yellow | adding a yellow title |

Codes (tag content) are predetermined between the digital camera 6, which serves as an e-mail transmitting device, and the mail server 3.

The digital camera 6 then sends e-mail with the original still image data $P_0$ and the tag TG to the mail server 3 via the cellular telephone 4 by using the mailer function. The tag TG contained in the e-mail is handled as a regular e-mail message. That is, the e-mail with the original still image data $P_0$ is sent from the digital camera 6 to the mail server 3 as regular e-mail regardless of whether e-mail with a tag (shown in (B) of FIG. 2) or e-mail without a tag (shown in (A) of FIG. 2) is sent.

The mail server 3 reads the content of the tag TG included in the e-mail, and then edits the original still image data $P_0$ according to the content of the tag TG. More specifically, if the definition of the tag TG is as shown in Table 1 and in (B) of FIG. 2, the mail server 3 adds a purple frame F, forms a black background, and adds a yellow title T (for example, "R style"). The mail server 3 then attaches the still image data edited according to the content of the tag TG (hereinafter referred to as "edited still image data") to the e-mail, and distributes the e-mail to the personal computer 5 by performing regular processing. As a result, image data $P_1$ (edited still image data) shown in (B) of FIG. 2 is distributed.

On the other hand, if e-mail does not contain a tag, the mail server 3 directly attaches the original still image data $P_0$ to the e-mail, and then distributes the e-mail to the personal computer 5 by performing regular processing. As a result, image data $P_1$ ($P_0$) shown in (A) of FIG. 2 is distributed.

The user who has received the e-mail is then able to view the image data $P_1$ attached to the e-mail.

According to the above-described data communication system, the original still image data $P_0$ captured by the digital camera 6 is attached to the e-mail, and the tag TG is also added to the e-mail. This enables the mail server 3 to edit the original still image data $P_0$ according to the content of the tag TG. Then, the edited still image data $P_1$ is attached to the e-mail, and is distributed to the personal computer 5.

With this arrangement, the following advantages can be obtained in the digital camera 6 by, for example, editing the still image data by using a tag.

Since the mail server 3 performs an editing operation on still image data based on an attached tag, the configuration of the digital camera 6 can be simply designed with a minimum user interface. The tag is a command indicating merely a simple description, thereby reducing the burden on the digital camera 6.

As long as a user interface is provided for inputting tags into the digital camera 6, the number of types of tags can be increased in the future since the tags are described only in text format. Simultaneously, by increasing the number of types of tags which can be interpreted by the mail server 3, an unlimited number of applications (for example, applications having various editing functions) can be implemented. Additionally, since data is edited based on an application by the mail server 3, it is only necessary to upgrade the mail server 3 for a new application as required.

As discussed above, since still image data is edited by utilizing a tag, it can be sent to a receiving terminal while imposing a smaller burden on the digital camera 6.

In the data communication system of the present invention, the burden imposed on the mail server 3 is also small. More specifically, the mail server 3 is able to perform the editing processing by using general-purpose communication protocols, such as the known simple mail transfer protocol (SMTP) and post office protocol version 3 (POP3), as the communication means on the Internet 2.

It is only necessary for the mail server 3 to read and interpret the content of the tag described in the first part of the actual data, and to perform processing according to the content of the tag. Technically, therefore, the editing processing can easily be implemented.

By using the tag, applications can also be developed easily, thereby improving services of the mail server 3.

The services offered by the mail server 3 include introduction of unique tags. If the content of a unique tag is predetermined between the digital camera 6 and the mail server 3, the mail server 3 is able to perform processing unique to the user's request on still image data, attaches the edited image data to e-mail, and then sends it to a receiving terminal. As one type of tag, a tag indicating authorization to perform processing unique to the user's request, for example, a tag represented by [User Custom], is provided. By inputting such a tag, the processing unique to the user's request can be performed in the mail server 3.

The content of the tag can be predetermined between the mail server 3 and the digital camera 6 by, for example, providing web settings in the mail server 3, or simply exchanging a document therebetween. In the introduction services of the unique tags, limitations, such as the capacity and the number of tags, may be set by the mail server 3. If the capacity or the number of tags exceeds such limitations, the user may be charged for such an excess, thereby implementing a so-called "business method".

In the foregoing embodiment, the Internet is used in the information communication system as the communication means. However, the present invention is not restricted to the Internet, and, for example, Bluetooth may be employed.

Before describing details of the information communication system implemented by Bluetooth, a brief description of the communication technique using Bluetooth is given below. Bluetooth is used as the communication means between electronic devices, such as the digital camera 6 and the personal computer 5, and enables wireless communication between electronic devices by using short-range radio. Bluetooth also enables communication among a plurality of electronic devices. It is thus possible to easily and transparently establish connection between electronic devices regardless of the time and place. Bluetooth is also compact and inexpensive.

Figure 3:
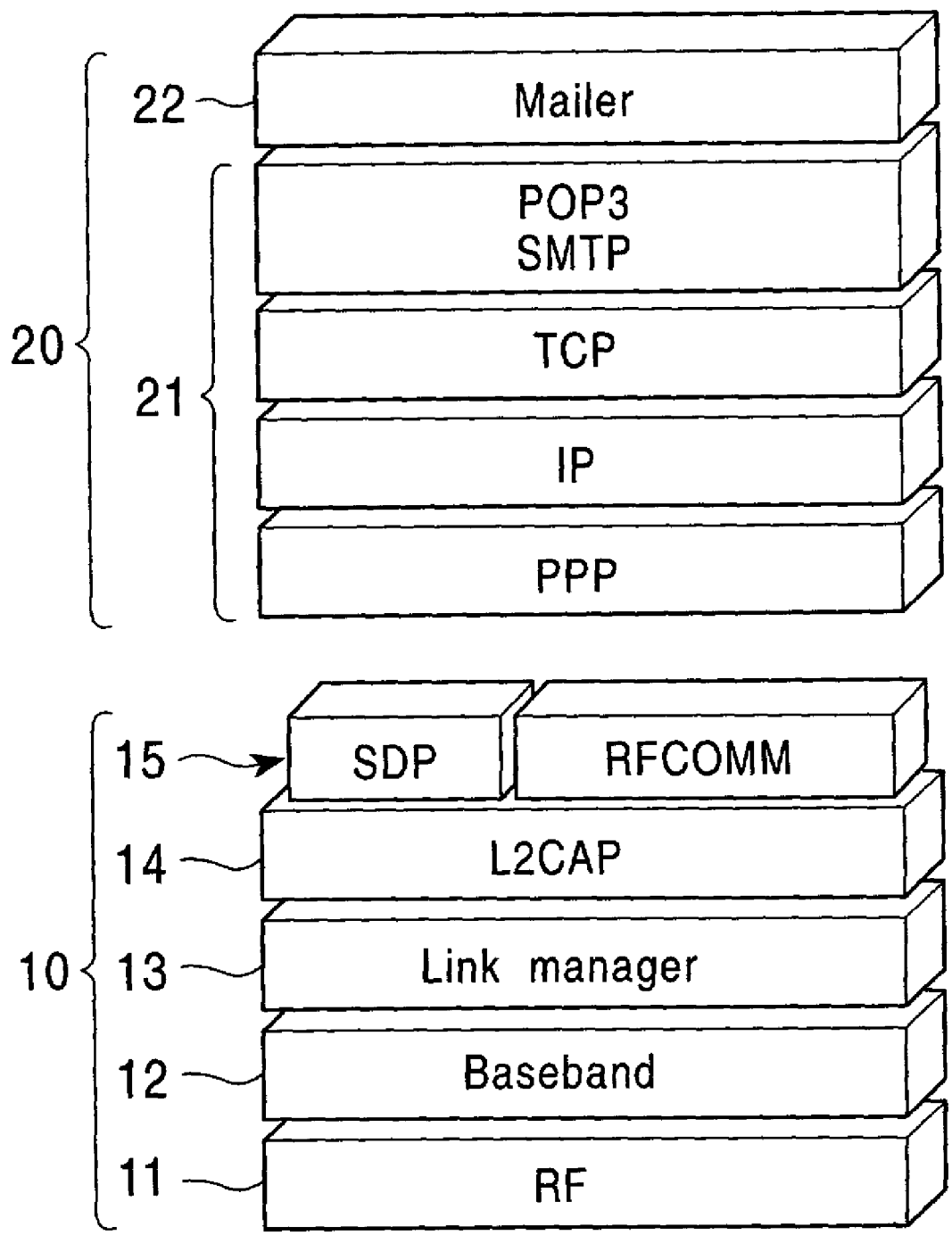
FIG. 3 schematically illustrates a protocol stack of Bluetooth and an application layer.

A Bluetooth protocol stack 10 is basically formed of, as shown in FIG. 3, an RF 11, which serves as a radio transmitter/receiver, a baseband 12 for forming data into Bluetooth packets, a link manager 13 for establishing and authenticating connection, an L2CAP 14 for dividing and integrating data, and an RFCOMM 15, which serves as virtual serial communication. An application layer 20, which is positioned at a level higher than the protocol stack 10, is formed of, as shown in FIG. 3, general-purpose protocols 21, such as PPP, TCP/IP, SMTP, and POP3, and a mailer 22. In Bluetooth, a profile is provided in which detailed rules for implementing the individual protocols and applications are described.

When using Bluetooth as the communication means, all the applications must be implemented according to the above-described profile. If a new application is to be constructed in Bluetooth, another profile must be defined. In actuality, however, it will take time to officially determine the Bluetooth standards because they must be planned, discussed, examined, and decided by organizations affiliated in the Special Interest Group (SIG).

However, the profile including TCP/IP shown in FIG. 3 is already defined, and applications running on this profile are flexible. As discussed above, TCP/IP is used as the communication protocol for implementing the present invention. Thus, Bluetooth can easily be used as the communication means of the data communication system of the present invention. Accordingly, by attaching a tag to e-mail, which is one of the functions of the communication means, applications can be speedily and easily developed.

As is seen from the foregoing description, by using a tag, various types of data can be sent and received according to e-mail using relatively simple protocols. Additionally, the types of tags can be increased so that applications can be speedily and easily developed even for Bluetooth having a severely constrained profile.

Although in the aforementioned embodiment image data is attached to e-mail and sent as the original data, another type of data, such as audio data, may be sent. In this case, a photograph or a profile of a speaker may be prestored in the mail server 3, and the mail server 3 may add the photograph or the profile to the audio data according to the content of the tag, and send the audio data to a receiving terminal.

In the foregoing embodiment, the digital camera, which is provided with a mail function, is used for sending original data. However, other devices, for example, a personal computer or a personal digital assistant (PDA) may be used as long as they have a mail function. In this case, such devices can also attach a tag and original data to e-mail, and send the e-mail to a receiving terminal.

What is claimed is:

1. A data communication system for sending and receiving e-mail between electronic devices by an e-mail system using a transmission control protocol/Internet protocol (TCP/IP) as a communication protocol, said data communication system comprising:

a transmitting electronic device including at least an e-mail sending and receiving function for attaching obtained original data to the e-mail, adding a processing command, and sending the e-mail to a network; and a relay server for receiving the e-mail sent from said transmitting electronic device, processing the original data attached to the e-mail based on the added processing command, attaching the processed data to the e-mail, and sending the e-mail to a receiving electronic device, wherein said processing command is added to the obtained original data at the time the obtained original data is obtained, and wherein the processing command indicates an instruction for editing the attached obtained original data, and wherein the processing command is described in text format and is predetermined by an agreement between said transmitting electronic device and said relay server, and wherein a user specific custom tag and a unique processing command are predetermined between the transmitting electronic device and the relay server, wherein adding the user specific custom tag allows editing of the attached obtained original data which is unique to a user's request, and wherein content of the user specific tag is predetermined between the transmitting electronic device and the relay server by exchanging information in advance of adding the user specific custom tag, wherein said electronic devices comprise an image pick-up device for capturing still image data as the obtained original data;
wherein the processing command comprises an editing command for editing the still image data.

2. A data communication system according to claim 1, wherein said transmitting electronic device is connected to said network via communication means using Bluetooth standards.

3. A data communication method for sending and receiving e-mail between electronic devices by an e-mail system using a TCP/IP as a communication protocol, said data communication method comprising the steps of:
   attaching original data obtained in a transmitting electronic device to the e-mail, adding a processing command, and sending the e-mail from said transmitting electronic device to a network;
   receiving the e-mail sent from said transmitting electronic device by a relay server on said network, processing the original data attached to the e-mail based on the added processing command, attaching the processed data to the e-mail, and sending the e-mail to a receiving electronic device; and
   adding said processing command to the obtained original data at the time the obtained original data is obtained, and
   wherein the processing command indicates an instruction for editing the attached obtained original data, and
   wherein the processing command is described in text format and is predetermined by an agreement between said transmitting electronic device and said relay server, and
   predetermining between the transmitting electronic device and the relay server-content of a user specific custom tag by exchanging information in advance of adding the user specific custom tag; and
   processing the user specific custom tag to perform editing of the attached obtained original data which is unique to a user's request according to the predetermined content predetermined between the transmitting electronic device and the receiving electronic device,
   wherein said electronic devices comprise an image pick-up device for apturing still image data as the obtained original data;
   wherein the processing command comprises an editing command for editing the still image data.

4. A data communication method according to claim 3, wherein said transmitting electronic device is connected to said network via communication means using Bluetooth standards.

5. An electronic device comprising:
   an image pick-up device for capturing still image data as obtained original data;
   a sending unit including an e-mail sending and receiving function for attaching the obtained original data to the e-mail, and sending the e-mail to a server; and
   an adding unit for adding a processing command to the e-mail,
   wherein the processing command indicates an instruction for editing the attached obtained original data, and
   wherein said processing command is added to the obtained original data at the time the obtained original data is obtained, and
   wherein the processing command indicates an instruction for editing the attached obtained original data, and
   wherein the processing command is described in text format and is predetermined by an agreement between the electronic device and the server, and
   wherein a user specific custom tag and a unique processing command are predetermined between the electronic device and the server,
   wherein adding the user specific custom tag allows editing of the attached obtained original data which is unique to a user's request, and
   wherein content of the user specific tag is predetermined by an agreement between the electronic device and the server by exchanging information in advance of adding the user specific custom tag,
   wherein the processing command comprises an editing command for editing the still image data.

6. A server comprising:
   a receiving unit including an e-mail receiving function for receiving an e-mail sent from an electronic device, comprising attached obtained original data and a processing command; and
   a processor for processing the attached obtained original data as a function of the processing command and attaching the processed data to the e-mail, and sending the e-mail to a receiving electronic device,
   wherein said processing command is added to the obtained original data at the time the obtained original data is obtained, and
   wherein the processing command indicates an instruction for editing the attached obtained original data, and
   wherein the processing command is described in text format and is predetermined by an agreement between the electronic device and the server, and
   wherein a user specific custom tag and a unique processing command are predetermined between the electronic device and the server,
   wherein adding the user specific custom tag allows editing of the attached obtained original data which is unique to a user's request, and
   wherein content of the user specific custom tag is predetermined by an agreement between the electronic device and the server by exchanging information in advance of adding the user specific custom tag,
   wherein said electronic device comprises an image pick-up device for capturing still image data as the obtained original data;
   wherein the processing command comprises an editing command for editing the still image data.

* * * * *